March 28, 1961    R. C. DAVIS    2,976,573
METHOD OF MOLDING A STEERING WHEEL
Filed May 22, 1958

INVENTOR.
Raymond C. Davis
BY
John T. Marvin
His Attorney

United States Patent Office 2,976,573
Patented Mar. 28, 1961

2,976,573
METHOD OF MOLDING A STEERING WHEEL
Raymond C. Davis, Dayton, Ohio, assignor to General Motors Corporation, Detroit, Mich., a corporation of Delaware
Filed May 22, 1958, Ser. No. 737,071
7 Claims. (Cl. 18—47.5)

This invention relates to trimming of flash from molded articles, and particularly, to a steering wheel and method of molding the same whereby flash after molding of soft resilient material is easily trimmed away.

An object of this invention is to provide a new and improved method of molding a steering wheel to facilitate trimming flash after molding.

Another object of this invention is to provide a method of making steering wheel including a reinforcing metal core around which complemental annular portions of relatively soft resilient material are molded on opposite sides of a joint relative to which harder insert material is placed to facilitate trimming of flash after molding.

Another object of this invention is to provide a method of making molded article made by molding a relatively soft resilient material in opposing sections of a mold defining a joint along which flash after molding must be trimmed and along which a preformed layer of harder material is provided to facilitate trimming of flash after molding.

Another object of this invention is to provide a method of making a molded article of relatively soft resilient material and including steps of providing a mold forming a cavity, having at least one juncture adjacent to the mold relative to which flash after molding must be removed, inserting a preformed member of relatively harder material adjacent to the juncture where flash occurs, filling the mold cavity and surrounding at least a portion of the preformed member with the relatively soft resilient material, molding the relatively soft resilient material together with the preformed member, and removing at least a portion of the preformed member as well as any molding flash adjacent thereto.

A further object of this invention is to provide a method of making a steering wheel of relatively soft resilient material in a mold having opposing sections forming a joint through which flash of the resilient material can seep from a cavity formed by the mold and including steps of providing a reinforcing metal core for the steering wheel in the mold, providing a preformed member of relatively harder material placed relative to the mold cavity adjacent to the joint as a backing, filling and molding relatively soft and resilient material in the cavity together with the preformed member, and trimming flash of the mold away from joints along opposite sides of the member serving as a backing of harder material to facilitate removal of relatively soft material.

Another object of this invention is to provide a method of molding a steering wheel wherein there is provided a reinforcing metal insert means around which opposing sections of relatively soft resilient material such as soft rubber are molded leaving a difficult to cut mold flash of the soft resilient material relative to which there is provided a member of relatively harder material such as hard rubber or a wafer of thermoplastic material such as polystyrene made thin like a foil placed and molded integrally with the soft resilient material and adapted to serve as a backing to be trimmed off together with the flash of soft resilient material.

Further objects and advantages of the present invention will be apparent from the following description, reference being had to the accompanying drawings wherein a preferred embodiment of the present invention is clearly shown.

In the manufacture of steering wheels for motor vehicles, difficulty is encountered in trimming steering wheels molded of soft resilient material and specifically a problem results when an attempt is made to cut or remove molding flash from a molded article along a juncture formed by complementary mold pieces. Specifically attempts have been made to use varying compositions for moldable resilient materials whereby a practical hardness for permitting trimming results in a finished molded article. The present invention presents a solution to a problem of removing molding flash and permits use of molding materials of varying mixtures in conjunction with a relatively hard insert member placed specifically along a juncture formed by cooperating mold members.

Figure 1:
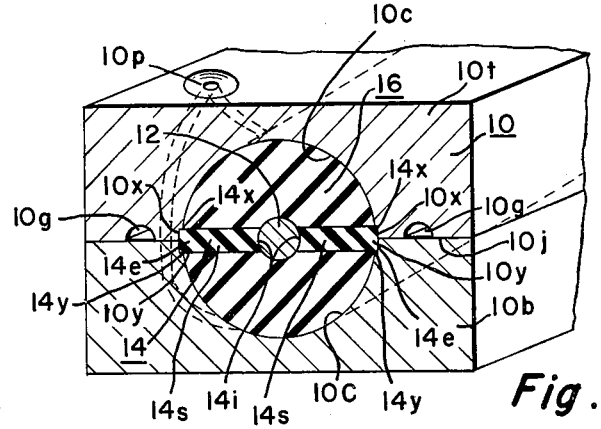
Figure 1 is a cross-sectional elevational view of a steering wheel being molded in accordance with the present invention.

Referring particularly to Fig. 1, there is shown a mold generally indicated by numeral 10 including a top member 10t and a bottom member 10b of the mold adapted to have surfaces forming a juncture 10j wherein leakage or molding flash can flow into a thin space resulting from imperfections or slight unevenness in substantially flat cooperating surfaces. This juncture 10j can also be referred to as a parting line relative to which the mold members 10t and 10b are separated from each other to permit removal of an article molded within a predetermined shape in a cavity formed by complementary cut out portions 10c and 10C provided by top and bottom mold members 10t and 10b, respectively. The view in Fig. 1 represents a cross section taken in elevation through a mold and it is apparent that at least one mold member, specifically the upper mold member 10t is provided with a pair of flash grooves 10g located on opposite sides of the cavity formed by the cut out portions 10c and 10C. These flash grooves are adapted to form pockets into which excess molding flash can escape during a molding operation. Flowable molding material is injected into the cavity formed by the mold members through a suitable opening or passage 10p shown extending through a top surface of the top mold member 10t for purposes of illustration. A completely sealed cavity cannot be provided within the mold members because an escape or space for relief of air in the mold must exist to permit displacement of air by the resilient flowable molding material injected into the mold. Thus some flash must occur where relief of air occurs as the air is displaced by the molding material. The molding material passes through a parting line or escape passage as formed by a juncture such as 10j and any excess molding material can collect in a flash groove such as 10g.

As illustrated in Fig. 1, mold members are placed in a position complementary to each other to provide a cavity in which a reinforcing metal core 12 can be suitably suspended so as to become part of a molded annular member or steering wheel made in accordance with the present invention. The metal core 12 is preferably embedded centrally within the soft resilient molded material.

In accordance with the present invention a pair of radially oppositely extending preshaped members of relatively hard material or insert means generally indicated by numeral 14 should be included on opposite sides of the metal insert or rod 12. This insert means 14 includes segments 14s of relatively hard material placed on each side of the metal insert 12. In the embodiment of the present invention illustrated in Figures 1 and 2, the segments 14s are provided with a radially inwardly extending portion 14i providing a concave surface complementary to an annular or outwardly curved surface of the metal insert 12. The members or segments 14s have radially outer end portions 14e provided with convex surfaces or even blunted ends terminating in top edges 14x and bottom edges 14y adapted to abut positively against an inner peripheral surface of top cut out portion 10c and bottom cut out portion 10y respectively adjacent to top corners 10x and bottom corners 10y respectively. If necessary, rectangular ends 14e can be provided at the radially outer portions of the segments 14s adapted to be complementary to cut outs of corners 14x and 14y such that flash of molding material passing around corners 14x and 14y adjacent to corners 10x and 10y respectively relative to parting line or juncture 10j can escape along the line of the juncture as far as flash grooves 10g.

Figure 2:
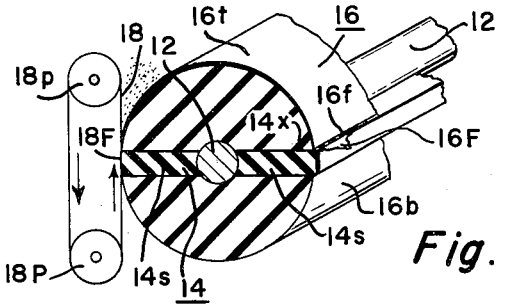
Figure 2 illustrates a flash trimming operation being performed on the steering wheel molded in accordance with the present invention.

After molding an annular member or steering wheel of soft resilient material to form a body 16 of the steering wheel, the body 16 is removed from the mold 10 and includes the annular metal insert 12 as well as the segments 14s of the wafer means 14. Top and bottom surfaces 16t and 16b of the body 16 are relatively smooth and finished as formed by inside surfaces 10c and 10C of the mold members 10t and 10b respectively. In the view of Fig. 2 a portion of jagged edge molding flash material 16f can be seen extending in part along an upper corner 14x of the insert and also as a major flash portion 16F that may be formed radially outside the metal insert 12 and segment 14s along a parting line or juncture such as 10j illustrated in Fig. 1. The flash portions 16f and 16F can be easily removed by use of a band of abrasive material 18 driven by pulleys 18p and 18P by any suitable means such as an electric motor, not shown, whereby motive power is supplied to the abrasive band 18 sufficient to permit a flat portion 10F of the band to engage the insert 14s and also the body 16 of soft resilient material such that flash portions 16f and 16F are ground or abraded away from the body 16 and radial outer end 14e of each of the segments 14s. It is to be understood that a grinding wheel or cone element can also be applied to critical trim points where flash portions exist and in either event the segments 14s are formed of a harder compound of material serving as a backing or support against which the relatively soft flash material is forced and together with which the relative soft flash material can be easily abraded or ground away from the annular molded steering wheel or molded article.

Figure 3:
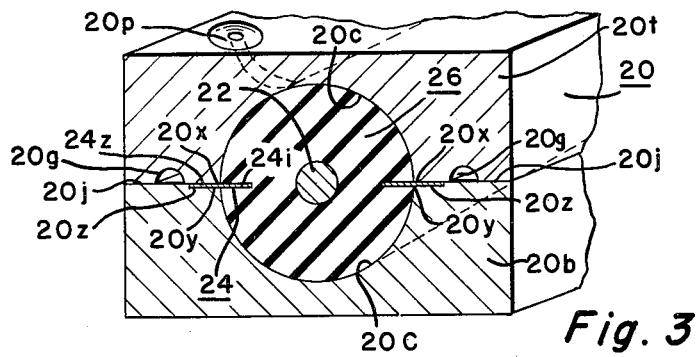
Figure 3 is a cross-sectional elevational view of a steering wheel being molded in another embodiment of the present invention.
Figure 4:
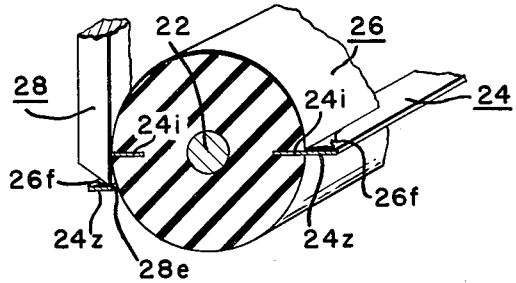
Figure 4 illustrates another flash trimming operation being performed on the steering wheel molded in accordance with the present invention.

Fig. 3 illustrates another embodiment of the present invention wherein a mold generally indicated by numeral 20 includes a complementary top member 20t and a corresponding bottom member 20b provided with cut out portions 20c and 20C respectively, adapted to form a central cavity relative to which a soft resilient molding material can be injected. The mold members provide adjacent corners 20x and 20y in the top and bottom portions respectively and a bottom recess or cut out corner 20z is provided adjacent to corners 20y to permit a hard material to be embedded partially within the cavity formed by the molds and partially between opposite surfaces forming a juncture 20j between the top and bottom surfaces of the mold members. The top mold members are provided with a flash groove 20g located radially on opposite sides of the central cavity for a purpose similar to that described in the embodiment of Figures 1 and 2. A reinforcing metal insert 22 is preferably provided within the mold cavity so as to be embedded within the soft resilient material which may be injected through a passage 20p which can be provided in one of the mold members as shown in Fig. 3. A wafer means or relatively hard foil-like material generally indicated by numeral 24 is placed so as to have a radially outwardly extending portion placed within the recess 20z and a radially inwardly extending portion is placed so as to extend partially into the cavity formed by the mold members but not extending radially inwardly to a position adjacent to the metal insert 22. A steering wheel or annular member generally indicated by numeral 26 is molded in the mold members shown in Fig. 3 and results in a product shown in a fragmentary perspective type view in Fig. 4. A flash portion 26f occurs between the wafer means 24 and the resilient soft material of the body 26. The flash 26f together with a radially outer portion 24z of the wafer means is trimmed away by a knife edge or blade cutting means generally indicated by numeral 28. A sharp bottom edge 28e is caused to move against flash portion 26f and the radially outer portion 24z of the wafer means to effect a clean cut off of all radially protruding material leaving radially inner portion 24i of the wafer means embedded within body 26 of the steering wheel. Since the wafer or foil-like member 24 is very thin the presence of the wafer means is difficult to distinguish especially when the same color or pigment is used for both the soft resilient material and the relatively hard material of the wafer means. The same coloring scheme is preferably provided with the structure illustrated in the embodiments of Figures 1 and 2. Examples of suitable compounds which may be used with the molding of a steering wheel in accordance with the present invention are as follows:

The hard material preformed members can be formed of a rubbery co-polymer of butadiene-styrene, or of other relatively hard elastomeric material. By the term elastomeric as used herein is meant any of the rubber-like materials such as natural rubber, butadiene-styrene copolymer, butadiene acrylonitrile copolymer, butyl rubber, polychloroprene, polysulphide rubbers and mixtures of these and other suitable materials suitably compounded. The following three examples of ingredients mixed in a suitable mixing apparatus and cured to form a preshaped member are listed by percentage of total material in mixtures cited for purposes of illustration:

*Example #1*

GRS semi ebonite compound:
| | |
|---|---|
| GRS | 19.85 |
| Altax | 0.80 |
| Lime | 2.20 |
| Zinc oxide | 1.00 |
| Indonex | 3.75 |
| Conductive carbon | 5.00 |
| Ground whiting | 48.85 |
| Rubber dust | 12.00 |
| Mineral rubber | 1.75 |
| Sulfur | 4.80 |
| | 100.00 |

Example #2

GRS reclaim semi ebonite compound:

| | |
|---|---|
| GRS | 14.90 |
| Whole tire reclaim | 4.00 |
| Mechanical reclaim | 1.45 |
| Altax | 0.95 |
| Indonex | 4.75 |
| Circo Lite | 1.00 |
| Conductive Black | 4.00 |
| Ground whiting | 46.00 |
| Rubber dust | 12.00 |
| Mineral rubber | 2.75 |
| Sulfur | 5.00 |
| | 100. |

Example #3

GRS ebonite compound:

| | |
|---|---|
| GRS | 24. |
| Altax | 0.36 |
| Zinc oxide | 1. |
| Sulfur | 10.10 |
| Indonex | 2.40 |
| Circo Lite Oil | 1.20 |
| Whiting (ground) | 56.74 |
| Mineral rubber | 2.00 |
| Carbon black | 1.00 |
| Wood flour | 1.20 |
| | 100. |

It is to be understood that the above three examples of hard material include ingredients available by trade names such as Altax, Indonex and Circo Lite Oil compounded together with various rubbery materials and additives as well as predetermined amounts of impurities sufficient to form a relatively hard material curable in a mold for a predetermined length of time. GRS means "Government Reserve Synthetic" and is a rubber-like polymer material. Altax is a trade name for an accelerator and any other suitable accelerator material can be provided in the mixture in place of Altax. Both Indonex and Circo Lite are trade names for oils added to the mixtures of which sample ingredients are given and which can be varied as necessary. The same trade names and variations are applicable to soft materials having mixtures as set forth below.

For the relatively soft resilient material various recipes of a spongey or soft rubbery-like material are given for purposes of illustration as follows:

Example #1

GRS compound—50 Shore A:

| | |
|---|---|
| GRS | 44.85 |
| Zinc oxide | 2.45 |
| Antioxidant | 0.25 |
| Altax | 0.80 |
| DPG | 0.35 |
| Carbon black | 30.85 |
| Plasticizer | 4.85 |
| Wax | 1.70 |
| Indonex | 13.00 |
| Sulfur | 0.90 |
| S.A.E. R515 | 100. |

Example #2

Natural rubber 40 Shore A:

| | |
|---|---|
| Smoked sheet | 100 |
| Zinc oxide | 5 |
| Stearic acid | 2 |
| Clay | 25 |
| Ground whiting | 25 |
| Circo Lite Oil | 7 |
| Altax | 0.7 |
| Sulfur | 3.0 |
| Non staining antioxidant | 1.0 |
| | 168.7 |

It is to be understood that the soft resilient material is distinguishable from plastic such as Bakelite because plastics such as Bakelite form a relatively brittle and hard flash which could be easily removed from a molded article. However, flash of soft rubbery material is too resilient to be easily cut or abraded away and therefore the preformed layer of harder material is provided along a joint where flash occurs. The flash is then in a location adjacent to a relatively hard material and can be easily cut or abraded away together with the relatively hard material. The annular steering wheel formed in accordance with the present invention can be painted with a plastic lacquer and this lacquer coating provides a smooth covering under which no juncture or flashing is visible. The hard material insert 14 can be easily trimmed without dragging of an abrading means or cutting tool due to soft resilient material and particularly the thin foil-like or wafer insert 24 can be easily cut away so as to be unnoticeable in a finished steering wheel. The problem of trimming flash from a steering wheel or annular member is eliminated through the use of hard material inserts located adjacent to a juncture between mold members relative to which flash occurs during a molding operation. It is to be understood that curing time for all steering wheel compounds can be given to range approximately between 12 and 15 minutes for molding each of the compounded materials for the sample recipes given above.

Sample materials as listed can be taken to represent order of preference for use of hard and soft resilient materials but use of relatively soft and relatively harder resilient material can entail any suitable mixtures of rubber-like materials.

While the embodiments of the present invention as herein disclosed constitute a preferred form, it is to be understood that other forms might be adopted.

What is claimed is as follows:

1. A method of molding a steering wheel, comprising, providing complementary mold members having cavity portions on opposite sides of a parting line and at least one of which has an extension recess, locating a metal reinforcing core intermediate the mold member cavity portions, inserting relatively hard backing segments along the parting line to fit at least in part in the extension recess from which the segments extend into space of the cavity portions, filling the mold member cavity portions with soft resilient material except where part of the segments extend therein and come into contact with the soft resilient material on opposite sides of the segments subject to flash of soft resilient material to locations outside the cavity portions, and removing flash of soft resilient material together with radially outer portions of said backing segments along the parting line so as to form a smooth outer steering wheel surface.

2. A method of making a molded article of relatively soft resilient material and including steps of providing a mold forming a cavity having a lateral extension recess and having at least one juncture adjacent to the mold from which soft resilient material escapes from this cavity as flash that after molding must be removed, inserting a preformed member of relatively harder material into the lateral extension recess at a location adjacent to the juncture where flash occurs, filling the mold cavity except for surrounding at least a portion of the preformed member with the relatively soft resilient material that fills the cavity together with the preformed member, and removing at least a portion of the preformed member projecting from the molded soft resilient material as well as any molding flash adjacent thereto backed by the preformed member during said removing thereof.

3. A method of making a steering wheel of relatively soft resilient material in a mold having opposing sections forming a joint through which flash of the resilient material can seep from a cavity formed by the mold and including steps of providing a reinforcing metal core for the steering wheel in the mold, positioning a separate preformed member of material relatively harder than the soft resilient material and placing the preformed member relative to the mold cavity in a location immediately adjoining the joint as a backing, filling and molding relatively soft and resilient material in the cavity together with the preformed member embedded therein at least partially while some flash of the molded soft material escapes at joints along opposite sides of the preformed member, and trimming flash of the molded soft material away from joints along opposite sides of the member serving as a backing of harder material positively to facilitate removal of relatively soft material.

4. The method of claim 3 wherein said trimming includes grinding abrasively relative to said backing member of harder material to a predetermined extent for neat and flush surfacing where flash occurred and along with which the flash of relatively soft material is also trimmed away readily.

5. The method of claim 3 wherein said trimming includes using a knife-edged cutting means that effects a clean cut off of all material including flash of soft material and only an outer end of the backing member along an outer peripheral surface of the steering wheel made neat and trim thereby involving minimum effort and difficulty for flash removal.

6. In a method of making a steering wheel of relatively soft resilient material in a mold having opposing sections forming a joint through which flash of the resilient material can seep directly from a cavity formed by the mold, the steps comprising, providing a reinforcing metal core for the steering wheel in the mold cavity, locating a thin wafer-like member of relatively hard material along the joint through which flash can seep from the cavity, filling and molding relatively soft and resilient material in the cavity into a position contiguous to at least a portion of said wafer-like member, and trimming only a radially outer portion of said wafer-like member and flash of relatively soft material away from the joint along a peripheral surface of said steering wheel such that flash removal is facilitated leaving a relatively unnoticeable edge of the wafer-like member in a substantially smooth and neat outer surface of the steering wheel.

7. In a steering-wheel-making method, the steps, comprising, providing a reinforcing metal core for the steering wheel in a mold having complementary parts, fitting the complementary mold parts relative to each other such that relatively soft resilient material can be supplied thereto, holding a preformed member of relatively harder material along an outer edge thereof to abut the complementary parts along a mating edge thereof such that flash of the relatively soft resilient material will be located immediately adjacent to the member of relatively harder material, filling the relatively soft resilient material around the reinforcing metal core and at least a portion of the preformed member of relatively harder material, and trimming flash of the molded soft material away from joints along opposite sides of the member serving as backing of harder material which is only partially removed though provided to facilitate removal of relatively soft material.

References Cited in the file of this patent

UNITED STATES PATENTS

| | | |
|---|---|---|
| 1,680,823 | Teed | Aug. 14, 1928 |
| 2,093,909 | Dodge | Sept. 21, 1937 |
| 2,155,488 | Hendrie | Apr. 25, 1939 |
| 2,185,568 | Rather | Jan. 2, 1940 |
| 2,232,216 | Daly | Feb. 18, 1941 |
| 2,814,211 | Hoagg | Nov. 26, 1957 |